Aug. 14, 1956     C. A. BARATELLI     2,758,707

SPECTACLE CASES

Filed March 26, 1954

INVENTOR
CHARLES A. BARATELLI
BY
Louis L. Gagnon
ATTORNEY 2,758,707
Patented Aug. 14, 1956

2,758,707
SPECTACLE CASES

Charles A. Baratelli, Southbridge, Mass., assignor to American Optical Company, Southbridge, Mass., a voluntary association of Massachusetts Application March 26, 1954, Serial No. 418,886

4 Claims. (Cl. 206—5)

This invention relates to spectacle cases and has particular reference to cases formed of a plurality of superimposed layers of sheet materials connected together and shaped to provide an open-end type of receptacle for spectacles, and method of making the same.

One of the primary objects of this invention is to provide an improved spectacle case formed of a plurality of superimposed layers of rigid and flexible sheet materials which are initially shaped as blanks stamped or otherwise cut out of the desired sheet material and subsequently superimposed upon one another and bent to form panels wherein the portions of rigid material function to support and reinforce the portions of flexible materials.

Another object is to provide a spectacle case which comprises an inner body layer formed of relatively soft flexible sheet material cut to the desired size and shape and folded so as to present front and back wall portions integrally connected along one side, an intermediate strengthening or reinforcing layer of relatively rigid metallic sheet material superimposed over the outer surface of the major portion of the body layer, and an exterior layer of selected sheet material superimposed over said reinforcing layer and attached directly to said body layer in a manner so as to conceal the reinforcing layer while retaining the reinforcing layer in free unconnected but relatively immovable position intermediate the body and exterior layers as protective means for both the front and back wall portions.

Another object is to provide a spectacle case of the above character wherein said body layer is formed of a selected material and of a preferred predetermined color and wherein said outer layer is of a selected color which may be in contract with the color of said body layer for decorative purposes, the contour shapes of said body and outer layers being of predetermined similar or contrasting designs to provide the resultant case with still further attractiveness and eye appeal.

A still further object is to provide a spectacle case of the above character wherein the various laminations can be formed of sheet material so shaped as to require the use of a minimum amount of the selected materials, and wherein the case is adapted to be manufactured at relatively low cost.

Other objects and advantages of the invention will become apparent from the following description taken in connection with the accompanying drawing, in which.

In the manufacture of spectacle cases for sale in the low-priced field, it has been difficult but desirable to provide such cases with many features found in relatively high-priced articles of this type. While it has been possible to form cases which have certain desired characteristics such as flexibility, attractiveness, strength, etc. it has been found very difficult to provide such cases with all or practically all of the desired characteristics. For example, in providing a low-priced case which is formed of a relatively flexible soft material into which an article such as a pair of spectacles may be inserted and carried without damage to the article, it has been found that such cases may be too flimsy and too easily deformed to provide the articles therein with a satisfactory degree of protection. Usually in attempting to overcome this difficulty strips or sections of relatively rigid material have been attached to the flexible material which has generally resulted in a relatively heavy case having an unattractive appearance. Such attachment of rigid portions to flexible portions has also generally required the use of special means such as rivets, clamps, cement or the like which thus adds to the resultant cost.

The present invention overcomes the above difficulties by the provision of a three-layer structure embodying a first or inner layer of soft flexible material forming the inner wall of the case which is in direct engagement with the article to be received thereby, a second or intermediate layer of relatively rigid shape-retaining lightweight material which is not attached directly to the inner layer but which reinforces and protects practically the entire case, and a third or exterior layer of flexible sheet material of a size such that when superimposed over said intermediate layer, a peripheral portion thereof will extend beyond the reinforcing layer throughout the entire periphery thereof, the exterior layer being stitched, cemented or otherwise secured throughout its peripheral edge directly to the inner layer whereby the intermediate reinforcing layer will be retained constantly in free assembled relation therewith to provide the resultant case with the desired shape and protective characteristics.

Figure 1:
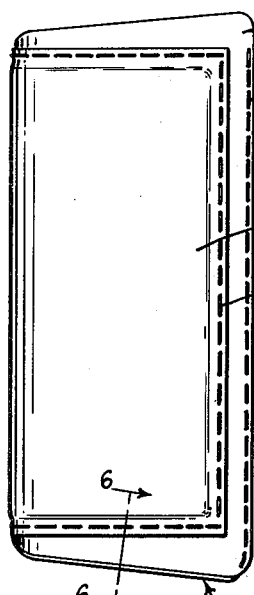
Fig. 1 is a front elevational view of a spectacle case embodying the present invention.
Figure 2:
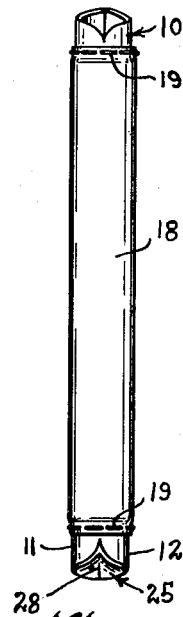
Fig. 2 is a side elevational view of the case shown in Fig. 1.
Figure 3:
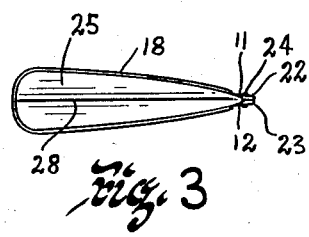
Fig. 3 is an elevational view of the lower end of the case shown in Fig. 1.
Figure 4:
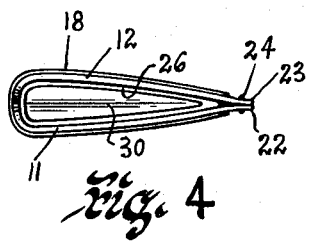
Fig. 4 is an elevational view of the upper end of the case shown in Fig. 1.
Figure 5:
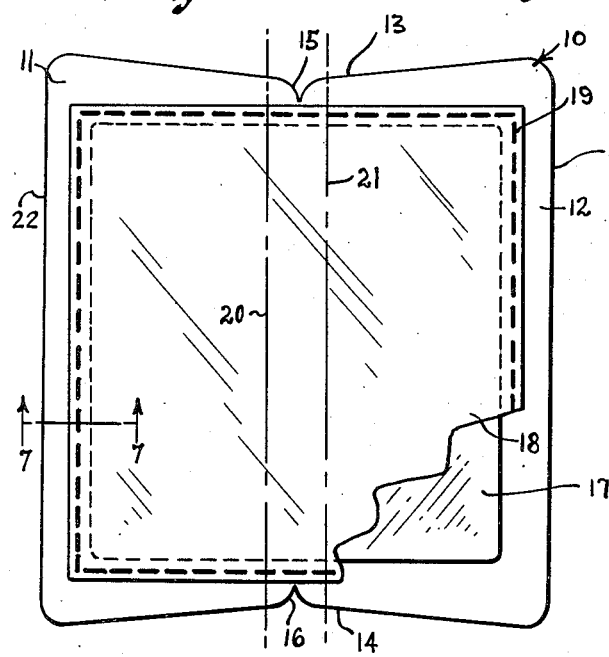
Fig. 5 is a plan view showing the portions of the case blanked out and in superimposed relation with one another before the final shaping operation is performed.

Referring in particular to the drawing wherein like characters of reference designate like parts throughout the several views, the embodiment of the invention as shown in Figs. 1–4 comprises a body element 10 shaped substantially rectangular as shown in Fig. 5 and formed as a blank which may be stamped or otherwise cut out of flexible sheet material of the selected type such as leather, plastic, fabric or other suitable material having a napped or otherwise prepared inner surface which is particularly adaptable for engagement with articles such as lenses without damage thereto such as by scratching or the like. The blank consists of two integrally connected panel portions 11 and 12, which when folded into spaced overlying relation with one another as shown in Figs. 1–4 will be seen as being of substantially the same contour shape and size. The blank when initially formed is preferably provided with inwardly and downwardly inclined edges 13 and 14 in the respective ends thereof (Fig. 5) which merge into respective notches 15 and 16 at the midway point, thereof, which depressions and notches are provided to present, in the final structure, an attractive appearance.

Superimposed upon the body element or blank 10 is a blank or sheet 17 of relatively rigid material such as sheet aluminum or the like which may be bent to the desired shape and which will retain such shape, the preferred material being also characterized by its ability to afford a relatively high degree of protection to articles carried by the device such as by being able to withstand an amount of crushing or the like during normal use of the device. The blank 17 of relatively rigid material is of a controlled size so that when superimposed upon the body layer 10 a peripheral area of the body layer 10 will remain exposed, the blank 17, however, covering a major portion of the blank 10 and thus, in the resultant structure, providing a high degree of protection to articles carried thereby.

Figure 7:
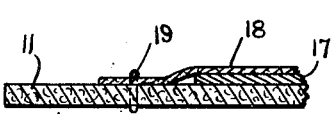
Fig. 7 is a horizontal enlarged sectional view taken substantially on line 7—7 of Fig. 5.

Superimposed upon the intermediate layer or sheet 17 is an outer layer 18 of flexible sheet material preferably of leather, fabric, plastic, or the like and preferably relatively thin and light in weight, which layer 18 is of a size to slightly overlap the intermediate rigid layer 17 throughout the entire periphery thereof. The overlapping area of the exterior layer 18 is subsequently stitched as indicated at 19 (Figs. 1, 5 and 7) directly to the exposed area of the body layer 10, or may be cemented, riveted or otherwise attached if desired. Such attachment of layer 18 to layer 10 thus supports the intermedaite metal layer 17 in desired position without direct attachment of the metal layer 17 to the other portions of the device. After the layers have ben assembled as described the structure is then bent substantially along the lines indicated by numerals 20 and 21 in Fig. 5 to form a relatively U-shape structure. The adjoining free side edges 22 and 23 of the body layer 10 are then stitched, cemented or otherwise attached together throughout the major portion of the entire length of the edges as indicated at 24 in Fig. 1. The edges 22 and 23 of the body layer 10, having flexible characteristics, will become closely superimposed and thus will provide in the resultant case the shape indicated in Figs. 3 and 4, which shape will be retained by the inherent characteristics of the intermediate layer 17.

Figure 6:
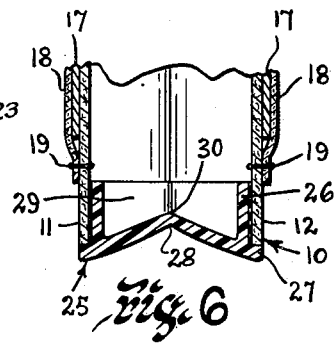
Fig. 6 is a fragmentary enlarged vertical sectional view taken substantially on line 6—6 of Fig. 1 looking in the direction of the arrows.

Into the lower end of the case is inserted a relatively rigid bottom 25 which is formed preferably of molded light-weight plastic or other suitable light-weight material. The bottom 25 is provided with an upwardly extending wall portion 26 (Fig. 6) which is shaped to snugly interfit within the opening in the lower end of the case and is secured to the inner surface of the inner layer 10 as by cementing. Extending outwardly from the bottom 25 is a peripheral flange 27 of a width substantially the same as the thickness of the layer 10 and upon which the end of the layer abuts.

In order to carry out the decorative aspect, the bottom 25 is provided with a longitudinal recess of groove 28 whereby the contours of the bottom 25 are thus enabled to blend attractively and smoothly into the decorative notch 16 formed in the lower end of the inner layer 10. Although shown as hollow in Fig. 6, the bottom 25 may be formed as a solid piece of material, if desired, without the inner cavity 29, in which event the inner floor of the case would appear flat rather than with the ridge indicated by numeral 30.

It is apparent that by constructing a case as described, the respective layers 10, 17 and 18 can be stamped out of large sheets of material with little waste. Also by securing the outer layer 18 directly to the inner layer 10 as described, the intermediate reinforcing layer is held in position over both front and rear walls of the device and no separate means is required for constantly retaining the intermediate reinforcing layer 17 in assembled relation therewith.

While the inner layer 10 and outer layer 18 may be formed of similar materials and colors, it is apparent that the construction of the case is such that an attractive appearance can be obtained by use of contrasting materials and/or colors. For example, a simulated snake-skin plastic exterior covering 18 colored brown and framed by the exposed marginal area of an inner layer 10 of tan-colored fabric makes an exceptionally neat and attractive case through employment of both contrasting materials and cooperative harmonizing colors. A varied selection of materials and colors are, of course, possible with the present design as well as use of many differently controlled contour shapes.

The foregoing specification describes simple and efficient means for accomplishing the objects of this invention. While the novel features of the invention have been described and are pointed out in the annexed claims, it will be understood that various omissions, substitutions and changes in the forms and details illustrated and described may be made by those skilled in the art without departing from the spirit of the invention. I, therefore, do not wish to be limited to the exact details described as the preferred only are set forth by way of illustration.

I claim:

1. A spectacle case comprising a first sheet of flexible material intermediately folded such that the opposed side edges of said first sheet will meet and the folded sheet will define a tube of generally triangular cross sectional shape, said meeting edge portions being secured together along the length thereof, and means closing one end of said tube, a second sheet of relatively rigid but bendable material superimposed over said first sheet and similarly folded, said second sheet being of somewhat smaller dimensions than said first sheet and being arranged to leave an uncovered margin of the first sheet along its opposed ends and the secured side edges thereof, and a third sheet of flexible material superimposed over said second sheet of relatively rigid but bendable material, said third sheet being of dimensional size and arranged so that its edges slightly overlap the edges of the second sheet about its periphery, and said edges being secured to the first sheet to retain said second sheet in assembled relation with the first sheet, and said second sheet by reason of its relatively rigid character giving form to said first sheet whereby said spectacle case will retain its substantially triangular cross sectional shape, and also by reason of its relatively rigid character will serve to prevent crushing of spectacles when contained in said case.

2. A spectacle case comprising a first sheet of flexible material intermediately folded along a pair of spaced parallel lines of fold to provide a front and a rear panel, the free edge of each panel opposite the lines of fold being secured together in adjacent relation so that the folded first sheet defines a tube of generally triangular cross sectional shape, and a shape retaining member of plastic material having a generally triangular shape secured in one end of said tube to close said end leaving but one end of the case open for insertion and removal of spectacles, a second sheet of relatively rigid but bendable material superimposed over said first sheet and similarly folded, said second sheet being of somewhat smaller dimensions than said first sheet and arranged thereon to leave an uncovered margin of the first sheet along its opposed ends and the secured side edges thereof, and a third sheet of flexible material superimposed over said second sheet of relatively rigid but bendable material, said third sheet being of a dimensional size and so arranged that it has a peripheral edge which overlaps the edges of the second sheet and is secured to the first sheet to retain said second sheet in assembled relation with the first sheet, and said second sheet by reason of its relatively rigid character giving form to said first sheet whereby said spectacle case will retain its substantially triangular cross sectional shape, and also by reason of its relatively rigid character will serve to prevent crushing of spectacles when contained in said case.

3. A spectacle case comprising a first sheet of flexible material intermediately folded along a pair of spaced parallel lines of fold in a manner such that the opposed side edges of said first sheet generally paralleling said lines of fold will meet and define a tube of generally triangular cross sectional shape, the meeting edge portions being secured together along the length thereof, and a rigid member of generally triangular shape secured in one end of said tube to close said end leaving but one end open for insertion and removal of spectacles, a second sheet of relatively rigid but bendable material superimposed over said first sheet and similarly folded, said second sheet being of somewhat smaller dimensions than said first sheet and being arranged to leave an uncovered margin of the first sheet along its opposed ends and the secured side edges thereof, and a third sheet of flexible material superimposed over said second sheet of relatively rigid but bendable material, said third sheet being of a dimensional size and so arranged that its edges slightly overlap the edges of the second sheet about its periphery but leaving the major portion of the mentioned margin of the first sheet uncovered thereby, said third sheet having its overlapping edges secured to the first sheet about the periphery of the second sheet to retain said second sheet in assembled relation with the first sheet, and said second sheet by reason of its relatively rigid character giving form to said first sheet whereby said spectacle case will retain its substantially triangular cross sectional shape, and also by reason of its relatively rigid character will serve to prevent crushing of spectacles when contained in said case.

4. A spectacle case comprising a first sheet of flexible plastic material intermediately folded to provide a front and a rear panel, the free edge of each panel opposite said fold being stitched together along their length to define a tube of generally triangular cross sectional shape, and a bottom piece of shape retaining plastic having a generally triangular shape secured in one end of said tube to close said end leaving but one end of the case open for insertion and removal of spectacles, a second sheet of relatively rigid but bendable material superimposed over said first sheet and similarly folded, said second sheet loosely resting on the first sheet and being of somewhat smaller dimensions than said first sheet and so arranged as to leave an uncovered margin of the first sheet along its opposed ends and the secured side edges thereof, and a third sheet of flexible plastic material superimposed over said loosely resting second sheet of relatively rigid but bendable material, said third sheet being of a dimensional size and so arranged that it has a peripheral edge which slightly overlaps the edges of the second sheet about its periphery, said overlapping edges of the third sheet being secured to the first sheet about the periphery of the second sheet to retain said second sheet in assembled relation with the first sheet, said third sheet further having a contrasting effect with the first sheet while concealing as well as supporting the second sheet in place, and said second sheet by reason of its relatively rigid character giving form to said first sheet whereby said spectacle case will retain its substantially triangular cross sectional shape, and also by reason of its relatively rigid character will serve to prevent crushing of spectacles when contained in said case.

References Cited in the file of this patent

UNITED STATES PATENTS

| | | |
|---|---|---|
| 1,699,712 | Pratt | Jan. 22, 1929 |
| 2,455,079 | Mercer | Nov. 30, 1948 |
| 2,650,700 | Wolf | Sept. 1, 1953 |